Feb. 2, 1932.        R. DEL V. ZENO        1,843,610
METHOD AND APPARATUS FOR MOLDING TILES
Filed Oct. 2, 1928        2 Sheets-Sheet 1

Inventor
R. Del Valle Zeno
By Lacey & Lacey, Attorneys

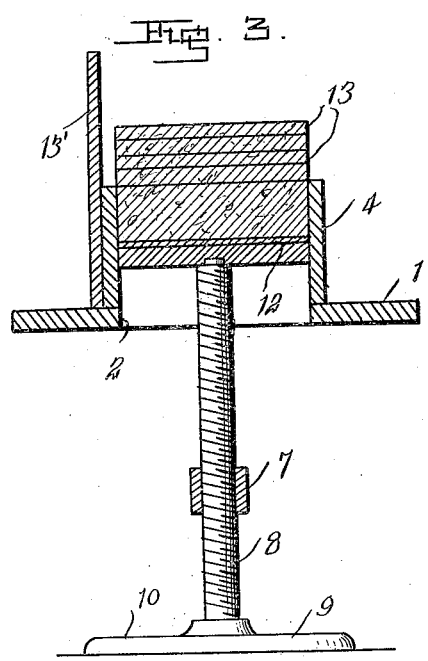
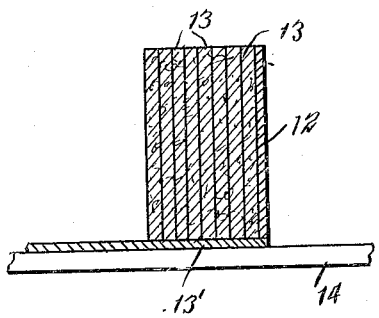
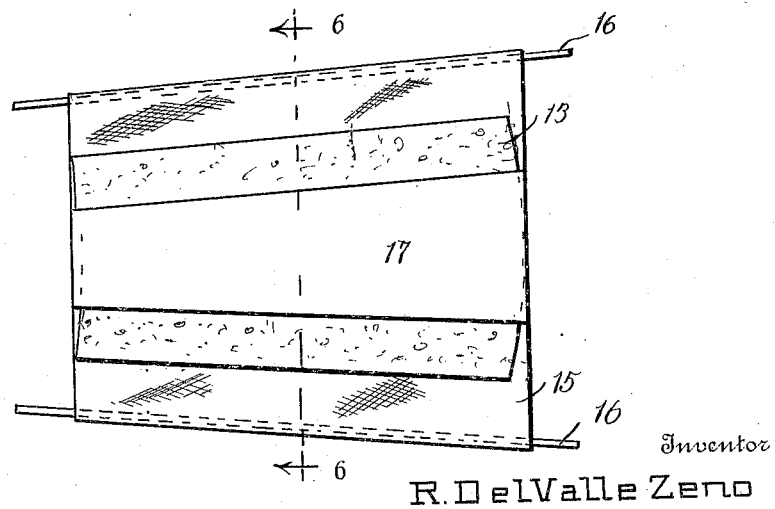

Patented Feb. 2, 1932

1,843,610

UNITED STATES PATENT OFFICE

RAFAEL DEL VALLE ZENO, OF HATO REY, PORTO RICO

METHOD AND APPARATUS FOR MOLDING TILES

Application filed October 2, 1928. Serial No. 309,823.

The present invention is directed to a method and apparatus for molding roofing tiles, or the like.

The primary object of the invention is to provide a method whereby tiles can be uniformly molded without the aid of complicated machinery.

Another object of the invention is to provide a method wherein a mass of material in a pliable state is cut into slabs of uniform thickness which are subsequently molded into the desired form.

Another object of the method is to provide means whereby the slabs after being cut from the mass can be conveniently removed from the mold box and retained in a flat condition until subjected to the action of the mold form.

The method is clearly explained by reference to the accompanying drawings, in which:—

Figure 3 is a sectional view on line 3—3 of Figure 1, and on an enlarged scale.

Figure 4 is a view showing the slabs in the position after being removed from the mold box, the pallet and plate being shown in section.

Figure 5 is a plan view showing the slabs upon the fabric sheet and the mold in place upon the slab.

Figure 1:
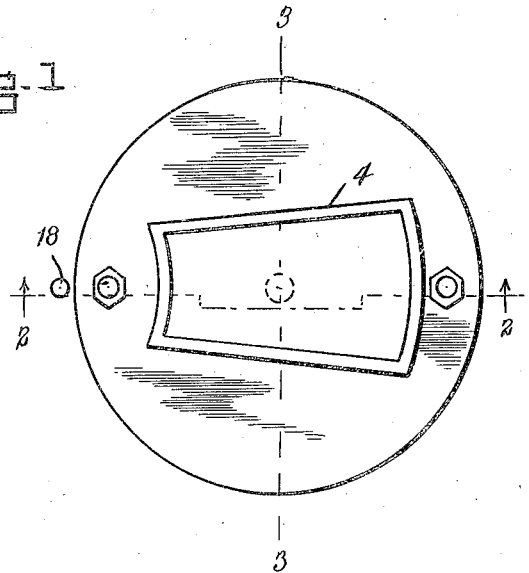
Figure 1 is a plan view of the mold box and table.

In practicing the method I provide a table 1 having an opening 2 formed therein in which is normally engaged a follower 3 corresponding in shape to the opening. This opening is of tapered formation and corresponds to the shape of a mold box 4 which has its lower ends and sides fixed to the table 1. The table is supported by an arcuate bracket 5 the arm 6 thereof being bolted to the table 1 at opposite ends of the mold box 4. This bracket is provided with a centrally located bearing 7 which is threaded upon the screw shaft 8, said shaft having a base 9 adapted to be secured in any approved manner to a platform 10, or if desired this base can be secured to the floor.

The upper end of the screw shaft 8 is rotatably connected to the follower 3.

Since the screw shaft 8 is fixed it will be obvious that when the table is rotated in one direction the follower 3 will be moved upwardly in the mold box, and downwardly when the table is rotated in a reverse direction to lower the follower into the opening 2, said follower forming, in effect, a bottom for the mold box. It is in this box that the plastic material 11 or mass of proper consistency is placed and tamped, as shown in Figure 2 of the drawings.

Figure 2:
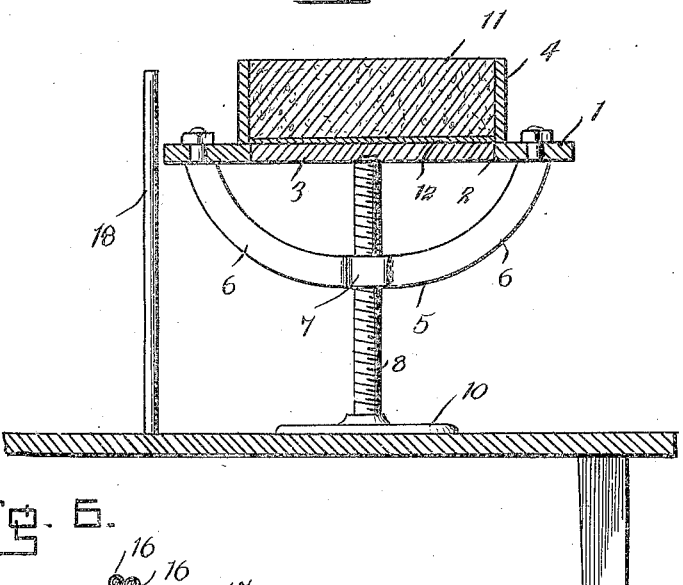
Figure 2 is a sectional view on line 2—2 of Figure 1.

A sheet metal plate 12 is placed upon the follower before the mass is deposited therein, as clearly shown in Figure 2.

As shown in Figure 1 the mass of plastic material has been tamped in the box 4, and when it is desired to force the same upwardly the table is rotated a predetermined distance in order that a portion of the mass will extend above the mold box whereupon a wire is passed through the mass to cut the same into slabs 13, as shown in Figure 3. After the follower has elevated the entire mass the last slab will rest upon the plate 12. A pallet 13' is then placed along one of the sides of the slabs and the plate 12 tilted, whereupon the slabs can be conveniently lifted and placed upon a support 14 in situ for convenience in handling.

Figure 6:
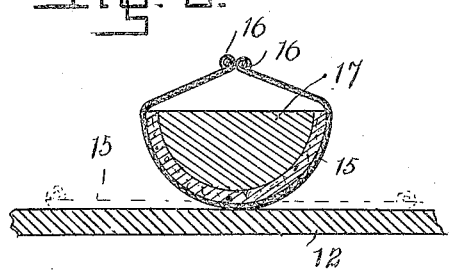
Figure 6 is a sectional view through the mold form, slab and fabric sheet, showing the manner in which the fabric sheet is manipulated to form the slab into the proper shape.

The slabs are molded into tile form by placing the same on a fabric sheet 15 previously placed upon a table or other support. The sheet has carried by its longitudinal edges rods 16 to facilitate holding of the sheet. A mold form 17 is employed and is of tapered formation, and may be formed from any suitable material, said form being placed upon the slab 13 after which the rods 16 are grasped and drawn upwardly in order that the sheet 15 will move the slab into intimate contact with the form, as shown in Figure 6 which can be readily accomplished since at this stage of the method the slab is pliable. The sheet is then removed and the now molded slab is permitted to harden. To more conveniently remove the sheets 15 the mold form 17 is inverted.

It will be observed that the sheet will be held tightly folded upon the slab, whereupon the design or weave of the sheet will be imparted to the tile to impart thereto an attractive appearance. If it is desired to impress a design upon both faces of the slab a sheet of fabric may be pressed upon the upper face of the slab when in its flat condition, and then removed before the sheet 15 is folded.

It is essential that the slab be of uniform thickness and in order to accomplish this the periphery of the table 1 is graduated in any approved manner, the graduation coacting with the vertical rod 18. Thus the table can be rotated a distance to elevate the mass 11 to a point of desired thickness after which the wire cutter is passed through the mass until a number of slabs have been produced. The lowermost slab will remain on the sheet 12 so that it can be placed in the position as shown in Figure 4 for convenience in handling, previous to being subjected to the molding operation.

What is claimed is:—

A mold comprising a fixed screw, a bracket on the screw, a table carried by the bracket and provided with an opening, a forming member secured to the table in line with the opening therein, and a follower in the opening of the table and mounted upon said screw and adapted to be advanced thereby upon rotating the table to project the material from the forming member a distance for severance to provide a slab of desired thickness.

In testimony whereof I affix my signature.
RAFAEL del VALLE ZENO. [L. S.]